United States Patent [19]

Whitney

[11] 4,248,375
[45] Feb. 3, 1981

[54] CLOCK THERMOSTAT APPARATUS HAVING MEANS FOR REDUCING THE SETBACK TEMPERATURE WHEN THE NORMAL TEMPERATURE SELECTION IS TURNED DOWN

[75] Inventor: John M. Whitney, Minneapolis, Minn.

[73] Assignee: Honeywell Inc., Minneapolis, Minn.

[21] Appl. No.: 71,148

[22] Filed: Aug. 30, 1979

[51] Int. Cl.³ ............................ F28D 5/00; F23N 5/20
[52] U.S. Cl. ................................. 236/46 R; 165/12; 337/305
[58] Field of Search ................ 236/46 R, 47; 165/12; 337/301–305

[56] References Cited

U.S. PATENT DOCUMENTS 4,129,847 12/1978 Teichert ............................... 337/301

*Primary Examiner*—William E. Wayner
*Attorney, Agent, or Firm*—Clyde C. Blinn

[57] ABSTRACT

A clock thermostat apparatus adapted for controlling temperature conditioning apparatus maintains a normal control temperature in a space and during certain selected time periods deviating from the normal temperature control by resetting the normal temperature control to some lower temperature for comfort and energy conservation. The clock thermostat apparatus has a manual temperature selection means and a manual temperature deviation selection means for selecting the normal control temperature and the amount of reset or deviation during the selected time period. A connection means is provided between the temperature selecting means and the temperature deviation selection means to turn the temperature deviation selection means to a lower value when the temperature selection means is moved to some predetermined low temperature. When the normal control temperature selection is reduced by the temperature selection means, the temperature maintained is not reset to a low temperature during a setback time period which might be so low that freezing of water pipes would result in the space wherein the temperature is being controlled.

6 Claims, 6 Drawing Figures

CLOCK THERMOSTAT APPARATUS HAVING MEANS FOR REDUCING THE SETBACK TEMPERATURE WHEN THE NORMAL TEMPERATURE SELECTION IS TURNED DOWN

BACKGROUND AND SUMMARY OF THE INVENTION

Clock thermostat apparatus for controlling the temperature in a space at a normal control temperature during certain periods of time and reducing the controlled temperature to some lower temperature at night or during selected periods of time for both comfort and energy conservation are broadly old, as shown in the Carl G. Kronmiller U.S. Pat. No. 2,558,617, which issued June 26, 1951. In such clock thermostat apparatus, generally two levers are provided for selecting the normal control temperature and the nighttime setback temperature and when the clock thermostat time control means is present to reduce the temperature to the night setback temperature at some predetermined period of time, the homeowner can readily see that the nighttime setback temperature will be as set by the second lever. Where a temperature control apparatus has a temperature selection means and a deviation temperature selection means to preset the amount of deviation which is obtained when the time control apparatus moves into the setback time period, the operator is not as likely to notice that the setback temperature, especially when the normal temperature selection means is set rather low, will be even lower and might result in a freezing position in the home or establishment in which the clock thermostat apparatus is being used.

SUMMARY OF THE INVENTION

The present invention is concerned with a clock thermostat apparatus having a temperature selection means for selecting the normal temperature being controlled in the space by a temperature responsive means and limiting the lowest temperature which can be maintained in a space during night setback time. A deviation selection means is provided for setting a temperature deviation or reset from the normal temperature control which would take place when the time control apparatus moves into a predetermind time period in which the temperature is desired to be reduced for comfort and energy conservation. Thus, if a deviation temperature selection means was set at 15° and the normal temperature control selection means was set at 70°, during the selected period of time in which the temperature is to be reset, the temperature would be maintained at 55°. In order to prevent the reset temperature from being set too low should the normal temperature selection means be set low, a connection means is provided between the temperature selection means and the deviation selection means so that when the normal temperature selection means is turned below some predetermined value, the deviation selection means is moved to reduce the temperature deviation, thus preventing the reduction of the space temperature below a safe value during a temperature reset time period should the homeowner turn down the temperature selection means to some low value.

DESCRIPTION OF THE PREFERRED EMBODIMENT

Figure 1:
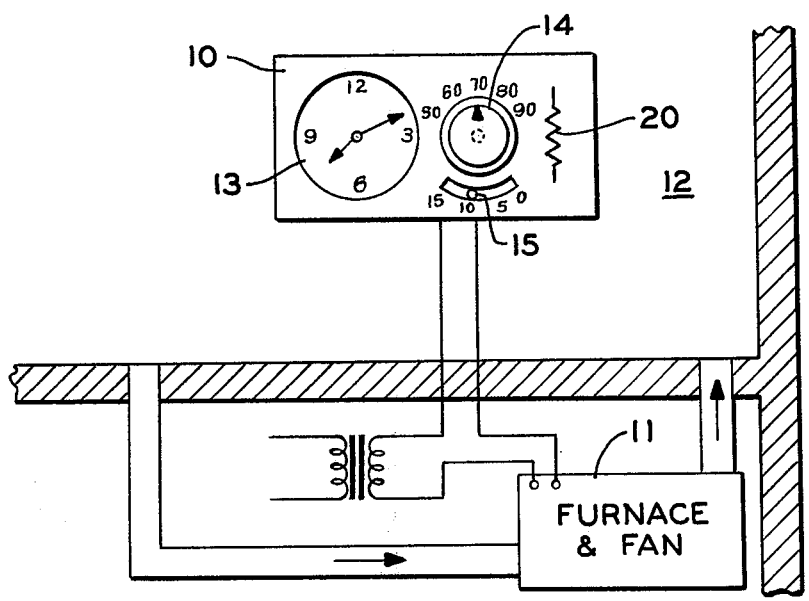
FIG. 1 is a schematic representation of the clock thermostat apparatus shown for controlling the operation of a furnace to maintain the temperature in a space.

Referring to FIG. 1, the clock thermostat apparatus 10 is adapted for connection to a temperature conditioning apparatus or furnace 11 for controlling the temperature in a space 12. Clock thermostat apparatus 10 has a time control means 13 such as a mechanical or electrical clock mechanism, a temperature selection means 14 for selecting the normal temperature to be controlled and a deviation selection means 15 for selecting the amount of deviation or reset from the normal temperature control during predetermined periods of time. As shown, the temperature selection means is set at 70° so that the temperature responsive apparatus 20, which is shown as a temperature responsive resistance element, controls the furnace 11 to maintain a temperature of 70° in the space 12. Deviation selection means 15 is set on 10° so that when a predetermined time comes about as preselected by the homeowner, the normal temperature control would deviate or be reset 10° below the 70° setting to a temperature of 60°.

Figure 2:
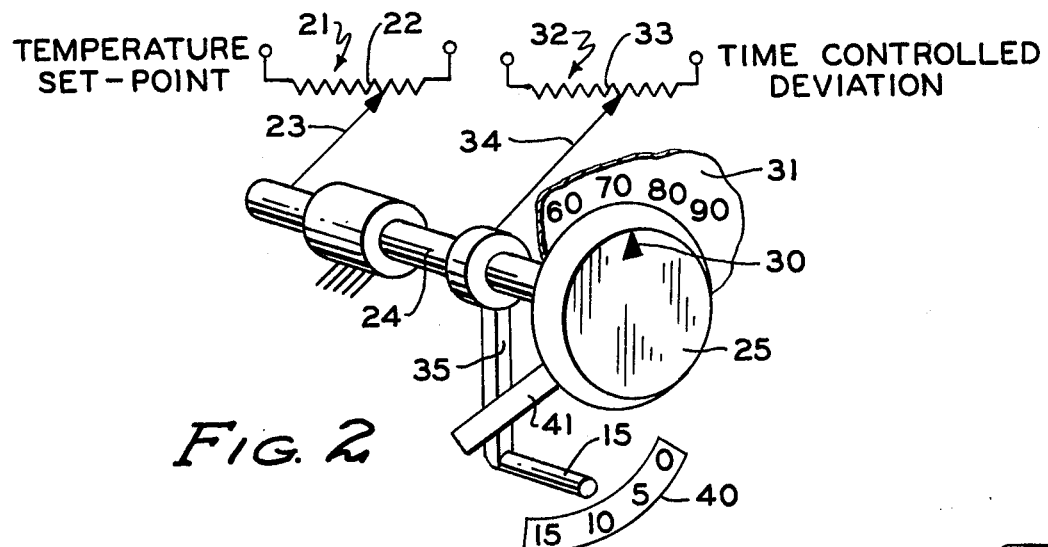
FIG. 2 is a schematic representation of the apparatus used in the preferred embodiment of the clock thermostat apparatus for selecting normal temperature control and the temperature deviation control.

Referring to FIG. 2, a schematic representation of the temperature selection means 14 and temperature deviation selection means 15 is shown with potentiometer 21 as a resistance element 22 and a wiper 23 which is connected by a shaft 24 to the knob 25 for selecting the temperature by positioning an indicator 30 to the proper temperature on a scale plate 31. The position of the wiper 23 on the potentiometer 21 selects the temperature setpoint or control point to maintain the temperature indicated by 30. The temperature deviation is selected by the potentiometer 32 having a resistance element 33 and a wiper 34 which is positioned by lever 35 connected to temperature deviation selection means 15. By movement of 15 to the proper position on the scale 40, the deviation or setback in degrees is selected by changing the balance point or temperature of bridge circuit 52.

A connection means 41 between the temperature selection means or knob 25 and the deviation selection means or lever 35 and member 15 are provided so that when the temperature selection means or knob 25 is turned to some low temperature, such as 50°, member 41 will engage member 15 to move the temperature deviation selection means counterclockwise and thus reduce the temperature deviation so that the setback of temperature during the predetermined time period will not be too low.

Figure 3:
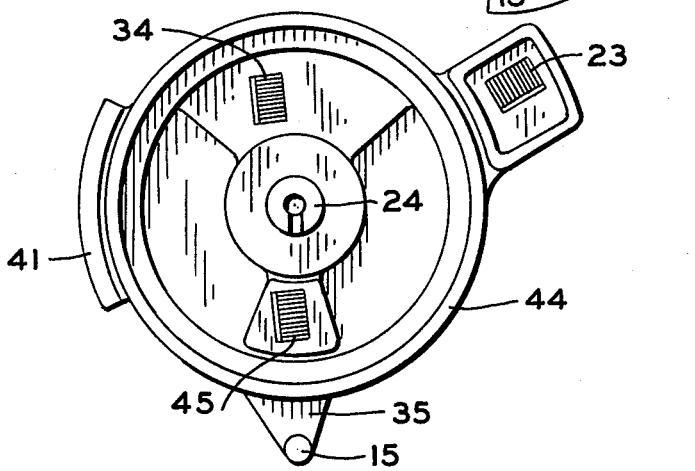
FIG. 3 is a specific showing of the potentiometer used in the preferred embodiment.
Figure 4:
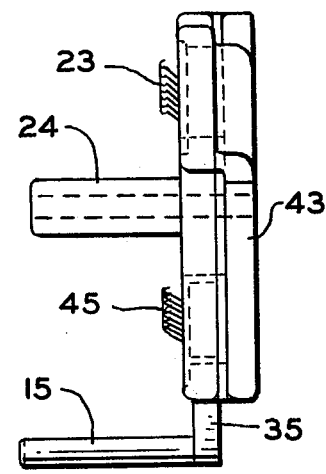
FIG. 4 is a side view of the potentiometer of FIG. 3.
Figure 5:
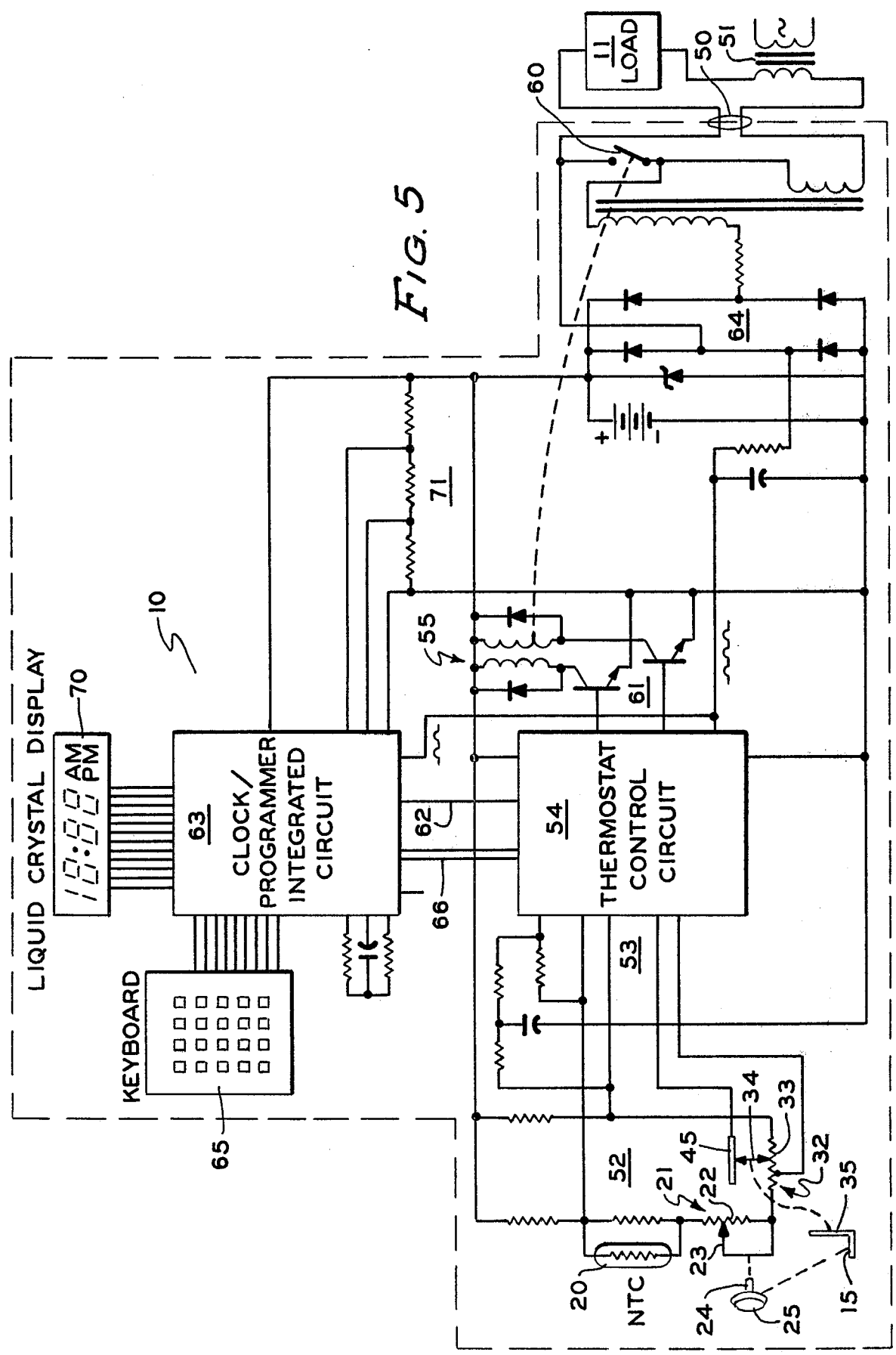
FIG. 5 is a schematic representation of the clock thermostat apparatus making use of the present invention.
Figure 6:
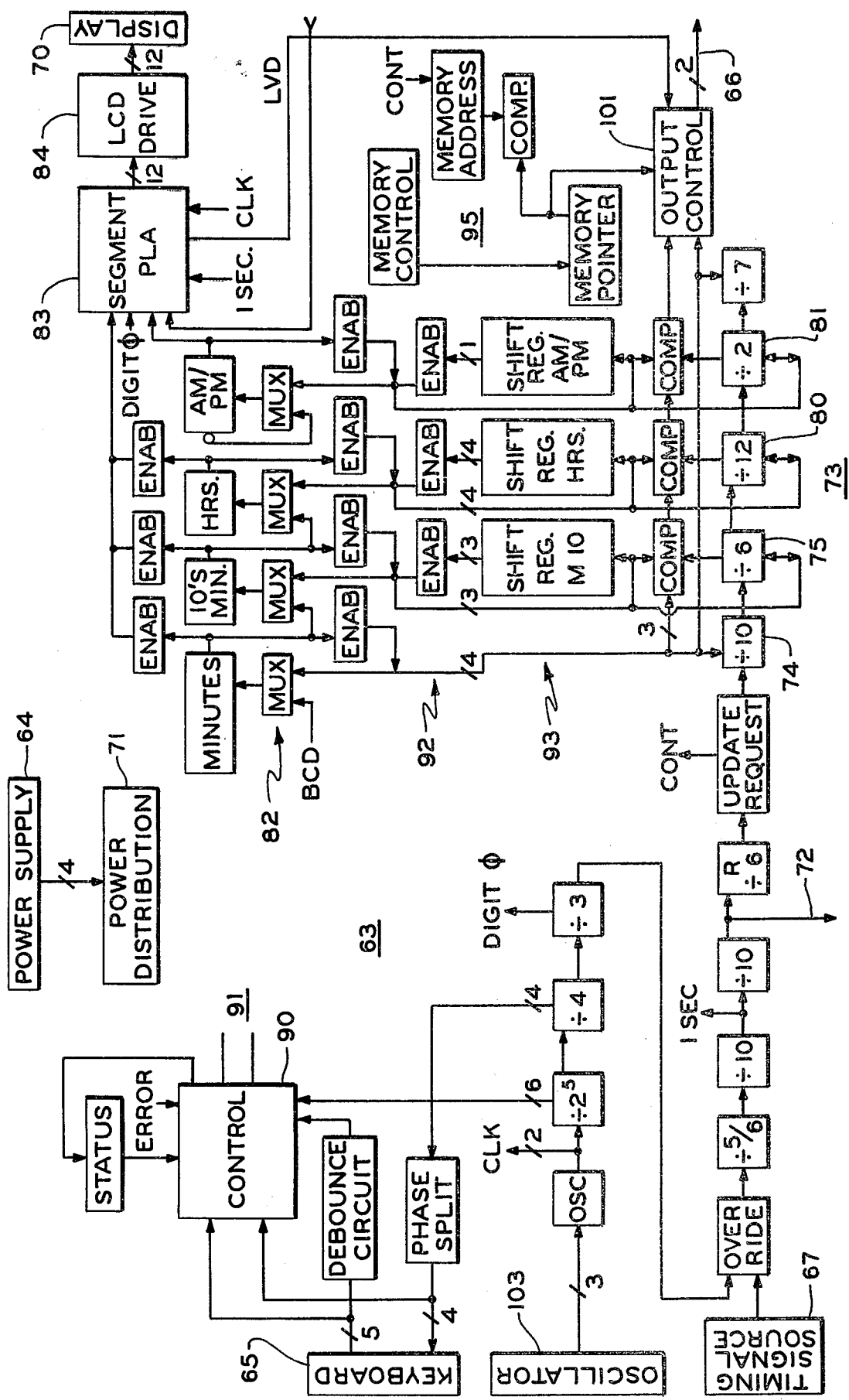
FIG. 6 is a block diagram of the electrical circuit of the apparatus shown in FIG. 5.

The specific potentiometer shown in schematic form in FIG. 2 is shown in FIGS. 3 and 4 and is used in the temperature control apparatus which will be heretofore explained as shown in FIGS. 5 and 6. Referring to FIG. 3, shaft 24 is connected to move wiper 23 when a temperature selection is made by knob 25 (not shown) connected to the shaft. Associated with shaft 23 and connected to the back plate member 43 is a member 41 which is moved counterclockwise when the temperature selection shaft 25 is moved to a low temperature. Pivotally mounted on shaft 24 is a member 44 carrying potentiometer wiper 34 and an associated wiper 45. Connected to member 44 is lever 35 and temperature deviation selection member 15. When member 41 moves counterclockwise it engages member 35 to move the temperature deviation selection means counterclockwise as was explained in connection with the schematic of FIG. 2.

The electronic clock thermostat apparatus 10 is shown schematically in FIG. 5 as connected over a two wire control circuit 50 to the load or condition changing apparatus such as a gas valve or furnace 11. Power is supplied by a transformer 51 which might be located in the basement near the furnace and is connected to an AC source. Thermostat 10 has a negative temperature coefficient (MTC) resistor 20 which changes in resistance as the space temperature changes. Element 20 is connected to the bridge circuit 52 for providing an input at 53 to a thermostat control circuit 54. Control circuit 54 has a relay 55 which is connected to a switch 60 for controlling the operation of the load. Control circuit 54 operates relay 55 through the output circuit 51 in a manner as described in one preferred embodiment of the control circuit as disclosed in the Arlon D. Kompelien application, Ser. No. 872,867, filed Jan. 27, 1978. Actually, thermostat control circuit 52 receives an impulse over circuit 62 from the electronic digital clock 63 and depending upon the temperature balance of the bridge circuit 52, relay or switch means 55 is operated to bring about the operation of the temperature conditioning apparatus or load 11.

Thermostat control circuit as well as the clock programmer integrated circuit 63 receives power from power source 51 whether switch 60 is open or closed. The clock programmer integrated circuit 63 is controlled by a conventional keyboard 65 and provides for digital readout at a digital indicator 70.

The control point for thermostat control circuit 54 is changed by potentiometer 21 when the wiper 23 is positioned by the control point setting knob 25. The deviation or reset selection is provided by the potentiometer 32 depending upon the position of member 15. The operation of the electronic thermostat portion provides for control of switch means 55 in accordance with the selected control point or control temperature desired as selected by potentiometer 21. When the desired heating control point is selected by the positioning of wiper 23, and the temperature at resistor element 20 exceeds the selected temperature, switch 60 is opened to de-energize the furnace or load 11.

The clock thermostat is operated by a keyboard 65 for selecting the proper time period for maintaining the different levels of temperature by thermostat control circuit 54. The digital clock display 70 which is of a liquid crystal type display provides for the showing of time whether it is a.m. or p.m. This time is displayed as the actual time of day when the clock thermostat is in operation and during the programming of the clock programmer, the display is used to display what time is being inserted into the program. In actual operation, by means of the keyboard, clock programmer integrated circuit 63 can be programmed to maintain a normal temperature during a certain time period of the day and at night for another selected time period, the temperature is reset from the normal control point as selected by potentiometer 21 by the amount of the temperature deviation as selected by potentiometer 32.

Referring to FIG. 2, a block diagram schematic of the clock programmer integrated circuit 63 is shown. The number of connecting wires when shown by the symbol i.e./4 is four connecting wires or conductors. The integrated circuit 63 receives power from power supply 64 over the power distribution network 71 to provide the ten second pulse over circuit 72 to the thermostat control circuit 54 and to the apparatus 73 for providing the minute pulses from counter 74, the tens of minute pulses from counter 75, the hour pulses from counter 80 and the day count from counter 81 which when fed through the circuit to the apparatus 82 provides the binary coded decimal output of minutes, tens of minutes and hours and whether it is a.m. or p.m., to be converted by the converting apparatus 83 and fed into the liquid display drive for displaying the time and a.m. or p.m. on display 70. By means of the control network 90 which is connected to the keyboard 65, the output at 91 controls the various enabling (ENAB) and multiplexing (MUX) or switching apparatus at 92 to store in registers at 93 the various times of day whether a.m. or p.m. at which the temperature is to be shifted to the different levels than normally controlled. Memory control apparatus 95 controls the comparison of the storage times in the register apparatus 95 with the actual time of the apparatus 73 upon the operation of the comparator circuit to provide the operation of the output control 101 to provide an output at 66 which is connected to the thermostatic control circuit. The output of 66 would be of a high or low signal to allow the thermostatic control circuit to control at a normal temperature or the energy saving temperature, whether it is a reduced temperature for heating or an increased temperature for cooling. Oscillator 103 is energized from the DC power source over the power distribution 71 to provide power for the control 90, as well as the clock, if no power is available from power source 62.

In operation, the clock programmer 63 is set by selecting various times from the keyboard 65 and entering these times in the shift register memory 93 so that when the actual time as provided from apparatus 73 is compared with the time stored in apparatus 93, the output to the thermostatic control circuit will control the thermostatic control circuit to different levels of temperature in the space as sensed by the resistor 20 taking into account the deviation as selected by 15.

OPERATION OF THE INVENTION

When a homeowner has selected a certain deviation or setback temperature required for the clock thermostat by the positioning of member 15, each time the clock circuit reaches the time period in which the setback temperature is to occur, the temperature as selected by knob 52 and potentiometer 21 is reset by the amount of the deviation. For the position shown in FIGS. 1 and 2, a 10° deviation is established. Thus with a temperature selector set at 70°, as shown by the position of knob 25 in FIG. 2, the setback temperature during the selected time period would be 60°.

With the single temperature setpoint control knob 25, the homeowner may decide to lower the temperature in the space or home to a much lower setting on an occasion, such as leaving the house for the weekend or going on vacation. The lowest temperature which can be maintained during the setback time is limited. Let us assume that the control point adjustment knob 25 is turned to a setting of 50°. The homeowner may not recognize that with a deviation of 10°, the space temperature would drop to 40° during the setback time period. This might result in the freezing of water pipes in the walls or other pipes such as sewage lines in the home. By the positioning of member 41, when the temperature control knob 25 is moved to a low setting, member 41 engages member 15 to move lever 35 counterclockwise and thus set the deviation setpoint back in a direction toward zero if not all the way to zero. The amount of movement member 41 has on the deviation selector 15 depends upon the position of member 41 and as member 41 is positioned further counterclockwise on knob 25, its affect on the deviation selector is more pronounced.

The embodiments of the invention in which an exclusive property or right is claimed are defined as follows:

1. An improvement in an electric clock thermostat having a control point selector for selecting the normal temperature to be maintained in a space when the thermostat is connected to a space conditioning temperature apparatus, a deviation selector for selecting the amount of temperature deviation desired from the normal selected temperature control point, and an electric time mechanism for selecting a certain time period during which the temperature control point deviates from the normal setting by the amount of the selected deviation, the improvement comprising, connection means between said control point selector and said deviation selector for moving said deviation selector to a predetermined position when said control point selector is moved to a predetermined temperature setting.

2. In a clock thermostat adapted for controlling temperature conditioning apparatus to maintain a normal control temperature in a space and during certain selected time periods deviating from the normal control temperature comprising temperature selection means, temperature control means having a temperature responsive means adapted to be connected to the temperature conditioning apparatus, first means connecting said temperature selection means to said temperature control means whereby a normal temperature control of a space temperature can be obtained, temperature deviation selection means, time control means, second means connecting said deviation selection means and said time control means to said temperature control means to reset said normal temperature control during predetermined time periods by a predetermined amount as selected by said deviation selection means, and connection means connecting said temperature selection means and said temperature deviation selection means to modify said temperature deviation selection means when said temperature selection means is operated to a predetermined temperature selection for reducing the amount of said reset of said normal temperature control.

3. The invention of claim 2 wherein said temperature selection means selects the temperature maintained in the space during a heating operation by the temperature conditioning apparatus, said deviation selection means selects the amount the space temperature is reset to a lower temperature during certain time periods by said time control means to conserve energy by maintaining a lower temperature, and said connection means reduces the resetting action when the temperature maintained would result in such a low temperature that freezing could result.

4. The invention of claim 2 wherein said temperature selection means is a potentiometer of an electric circuit of said temperature control means, said potentiometer is connected to a knob for selecting the normal controlling temperature, said temperature deviation means is a second potentiometer of said electrical circuit, said second potentiometer having manual means for selecting the amount of reset, and said connection means is a lever connecting said knob and manual means for driving said manual means to a lower setting when said knob is turned to a low temperature selection.

5. The invention of claim 2 wherein said temperature selection means is a potentiometer of an electric circuit of said temperature control means, said potentiometer is connected to a knob for selecting the normal controlling temperature, said temperature deviation means is a second potentiometer of said electrical circuit, said second potentiometer having manual means for selecting the amount of reset, and said connection means reducing the effect of said temperature deviation means when said temperature selection means is set to a different setting.

6. An improvement in a clock thermostat adapted for controlling temperature conditioning apparatus to maintain a normal temperature in a space as selected by a temperature selection means during a first selected time period as established by a timer means, means including said timer means for resetting the normal temperature to a lower temperature by an amount selected by a temperature setback selection means during a second selected time period, the improvement comprising, connection means connecting said temperature selection means and said temperature setback selection means to raise the temperature setback selected by said setback selection means and thus the temperature to be maintained during said second selected time period by said means for resetting when said temperature selection means is changed to select a predetermined low normal temperature to be maintained during said first selected time period.

* * * * *